United States Patent
Hunking et al.

(12) 
(10) Patent No.: US 9,044,047 B2
(45) Date of Patent: Jun. 2, 2015

(54) FOOD SEASONING REPLENISHMENT SYSTEM AND APPARATUS

(71) Applicants: Maurice Jarold Hunking, Little Elm, TX (US); Brian Dale Turley, Garland, TX (US)

(72) Inventors: Maurice Jarold Hunking, Little Elm, TX (US); Brian Dale Turley, Garland, TX (US)

(73) Assignee: Heat and Control, Inc., Flower Mound, TX (US)

( * ) Notice: Subject to any disclaimer, the term of this patent is extended or adjusted under 35 U.S.C. 154(b) by 158 days.

(21) Appl. No.: 13/679,397

(22) Filed: Nov. 16, 2012

(65) Prior Publication Data

US 2014/0137981 A1   May 22, 2014

(51) Int. Cl.
*B65G 53/10* (2006.01)
*A23P 1/06* (2006.01)
*B65G 53/18* (2006.01)

(52) U.S. Cl.
CPC . *A23P 1/06* (2013.01); *B65G 53/18* (2013.01); *B65G 2201/0202* (2013.01)

(58) Field of Classification Search
USPC .................... 406/138, 144, 91, 93, 145, 171; 414/291
See application file for complete search history.

(56) References Cited

U.S. PATENT DOCUMENTS

| | | | |
|---|---|---|---|
| 4,067,623 A | 1/1978 | Klein et al. | |
| 4,289,428 A | 9/1981 | Hiorns | |
| 5,106,240 A | 4/1992 | Dirkse et al. | |
| 5,855,671 A | 1/1999 | Scherping et al. | |
| 6,200,071 B1 * | 3/2001 | Karasawa | 406/194 |
| 6,210,080 B1 * | 4/2001 | Haul et al. | 406/13 |
| 6,390,736 B2 * | 5/2002 | Rassman et al. | 406/180 |
| 6,609,871 B2 * | 8/2003 | Pfeiffer et al. | 414/328 |
| 6,719,500 B2 * | 4/2004 | Pfeiffer et al. | 406/91 |
| 6,739,358 B2 * | 5/2004 | Pfeiffer | 141/10 |
| 6,764,253 B1 * | 7/2004 | Pfeiffer | 406/11 |
| 7,055,455 B2 | 6/2006 | Burke et al. | |
| 7,320,561 B2 * | 1/2008 | Ambs | 406/31 |
| 8,734,061 B2 * | 5/2014 | Terzini | 406/83 |
| 2011/0048317 A1 | 3/2011 | Hunking et al. | |

* cited by examiner

*Primary Examiner* — Joseph Dillon, Jr.
(74) *Attorney, Agent, or Firm* — Streets & Steele; Patrick K. Steele; Jeffrey L. Streets (57) ABSTRACT

A system to fluidize and convey finely divided particulate matter comprises a container with a top and bottom portion separated by a pan with apertures there through and a hatch to receive a volume of particulate matter into the container to be supported on the pan. The pan is funnel-shaped and has a discharge port at the lowermost portion of the pan. A bridging conveyor tube receives fluidized flow of the particulate matter from the discharge port and conveys the matter to a riser conveyor tube, which elevates the fluidized flow to a receiving bin remove from the container. The bridging conveyor tube and the riser conveyor tube receive gas streams provided through apertures from a bridging gas passage and a riser gas passage, respectively, to sustain fluidized flow from the discharge port of the pan to the receiving bin to minimize the air required to convey the matter.

22 Claims, 8 Drawing Sheets

FOOD SEASONING REPLENISHMENT SYSTEM AND APPARATUS

BACKGROUND OF THE INVENTION

1. Field of the Invention

The present invention relates to a system and apparatus to convey finely divided particulate matter with suppressed formation of airborne dust.

2. Background of the Related Art

Seasonings are often applied to processed foods such as, for example, potato chips, to enhance the consumers' taste experience by providing consistent flavoring. Seasonings are generally furnished to food processors in finely divided particulate form and packaged in bulk. Sacks of seasoning may weigh 35 to 50 lbs. (15.8 to 22.7 kg). The finely divided particulate form of bulk seasonings may be characterized as a powder with particle size ranging from about 3 microns up to about 3 mm. Some seasonings may consist of generally uniformly-sized particles while other seasonings may consist of particles ranging in size from large to small particles. The latter seasonings may segregate during transport.

A food processing plant for producing prepared foods generally has several processing lines producing food products that differ in size, shape and/or flavor. One or more seasonings may be required for a particular food product. Seasonings are provided to the processing line for being applied to the product at a seasoning station. Each seasoning station includes a bin to receive and store a supply of the seasoning to be applied to a food product on that processing line. The seasoning is generally dispensed from the bin and onto the product with the assistance of gravity. The supply of seasoning stored in the bin must be periodically replenished.

The intervals between replenishment of the seasoning stored in several bins on several processing lines in a plant will vary from bin to bin according to the size of the bin and the rate at which seasoning is dispensed from the bin for being applied to a food product. A seasoning replenishment container may remain idle between replenishments. Some seasonings tend to segregate during storage, while other seasonings may coalesce within the replenishment container to form clumps. These problems are generally remedied by plant personnel by mixing or stirring the seasoning within the replenishment container to restore the seasoning to a condition suitable for replenishing the bins on the processing lines. Plant personnel may apply blows on the side of the replenishment container, stir the seasoning using an implement or physically shake the replenishment container to disturb the contents. These solutions are unsatisfactory and may result in an uneven seasoning distribution on the product and lowered consumer satisfaction.

Bins from which seasoning is dispensed onto a food product on a processing line in a plant are generally elevated well above the plant floor to accommodate a gradually descending process line. This sloping configuration is incorporated into processing lines to provide for the movement of a food product at a uniform rate that enables consistent and uniform seasoning application. Tumblers, conveyors and bagging machines are generally structured to use gravity to move the food product from a higher elevation to a lower elevation. This arrangement requires that the bin for storing seasoning at each processing line be elevated well above the plant floor, and that seasoning from the replenishment container be elevated en route to the bin. Conventional equipment for elevating and conveying bulk seasonings include screw conveyors, drag conveyors and bucket elevators.

Seasonings generally comprise organic materials that may adhere to a variety of surfaces. Seasoning replenishment containers should be easily cleaned so that the same equipment can be used to convey different seasonings and used to produce different food products with an insignificant amount of seasoning carry over. Conventional equipment for elevating and conveying bulk seasonings are difficult to clean and require large radius turns and/or have large equipment footprints. In a food processing plant having several processing lines requiring several different seasonings, it is desirable to have a replenishment container that is easily cleaned and portable to provide for the convenient replenishment of seasoning in the bin of each processing line with minimum obstruction of the plant floor.

Handling of particulate matter such as seasonings risks generating particulate dust within the food processing plant environment. It is desirable to minimize the amount of dust generated within the plant. Pneumatic conveying systems for seasonings exacerbate the dust risk. The amount of particulate dust created using pneumatic conveying systems to transfer particulate matter is exponentially related to the volume and the velocity of the air used to convey the seasoning. Pneumatic conveying systems use a very large volume of moving air for each unit of mass of the seasoning moved by the system. The corresponding density of the conveyed air/seasoning stream is very low due to the use of large volumes of propulsive air mixed with a small mass of seasoning. In addition, pneumatic conveying systems cause a substantial amount of segregation and produce a very large amount of dust at the receiving bin of the conveying system.

A conveying system may be assessed using the phase density which is the mass, in pounds (or kilograms), of particulate matter moving past a given point in a minute divided by the volume of air used to convey that mass of particulate matter. A low phase density in a conveying system means a low efficiency, high energy costs to move a large mass rate of air, high segregation of the particulate matter from the moving stream of air and seasoning, high product or seasoning damage, and a large amount of unwanted dust generated within the plant. Conversely, a high phase density means a high efficiency, substantially lower energy costs, less segregation of the particulate matter from the moving stream of air and seasoning, low product and seasoning damage, and substantially less dust generated within the plant.

It has long been recognized by those using pneumatic conveyance systems that wear on components of a particulate matter conveyor system increases exponentially with the velocity. Empirical studies show that wear increases by a factor equal to the increased velocity raised to an exponent of 2.8. Depending on particle friability, size and shape, the damage to the seasoning particles increases by roughly the same exponential rate. It is therefore desirable to increase the phase density and lower the conveyance velocity to achieve exponentially reduced component wear and exponentially reduced seasoning damage.

SUMMARY

One embodiment of the portable replenishment system of the present invention includes a container to receive a bulk volume of food seasoning in finely divided particulate form to be applied to a food product. The container may comprise rolling elements to provide portability on a plant floor. The system conveys seasoning from the container to a bin at a seasoning station on a processing line in a plant. In one embodiment, the container is adapted to support a supply of pressurized air, such as an air compressor or a bottle of compressed air. In other embodiments, the container is connected to an external supply of pressurized air using flexible conduits such as hoses.

In one embodiment, the system comprises a container having a top portion and a bottom portion separated by a pan. The top portion of the container (above the pan) has a hatch generally near the top of the top portion and a discharge port generally at the lowest extent of the pan. The bottom portion of the container (below the pan and the top portion) has a gas connector connectable to a source of pressurized gas. The pan that separates the top portion from the bottom portion has a plurality of apertures connecting the interior of the bottom portion to the top portion to provide for the flow of gas from the source of pressurized gas, through the gas connector to the interior of the bottom portion of the container and through the apertures to the top portion of the container. The apertures of the pan are distributed about the pan and of a generally uniform size, and the plurality of gas streams flowing from the bottom portion through the apertures into the top portion fluidizes at least a portion of the particulate matter (seasoning) received onto the pan and proximal to the apertures in the pan. Fluidization of the portion of the particulate matter proximal to the apertures in the pan enables that portion of the particulate matter to fluidize and to flow, much like a liquid, to and into the discharge port to unload the pan. In a preferred embodiment of the replenishment system, the pan is shaped like a funnel to better guide the fluidized portion of the particulate matter downwardly to the discharge port which, in some embodiments, is centrally located within the pan.

An embodiment of the replenishment system further comprises a container having a bridging conduit connected at a first end to the discharge port of the pan and a second end connected to a riser conduit. In one embodiment of the replenishment system, the bridging conduit extends through the bottom portion of the container to deliver a stream of fluidized particulate matter from the discharge port of the pan to the riser conduit. In an embodiment having a funnel-shaped pan, the bridging conduit comprises a conveyor tube extending generally horizontally from the discharge port of the pan of the container to convey a stream of fluidized matter from the pan to the riser conduit. The bridging conduit further comprises a gas passage coupled along a substantial portion of the conveyor tube to provide pressurized gas to a plurality of apertures distributed along the conveyor tube of the bridging conduit. Gas flows from the gas passage through the apertures into the conveyor tube of the bridging conduit. At least a portion of the apertures through which gas from the gas passage enters the conveyor tube are disposed along a bottom side of the conveyor tube so that the plurality of gas streams emerging from these apertures and entering the conveyor tube are directed generally upwardly to counteract the effect of gravity on the particles in the fluidized stream flowing there through and to "unsettle" particulate matter that would otherwise settle out of the fluidized stream onto the bottom of the conveyor tube of the bridging conduit.

An embodiment of the replenishment system further comprises an elongate riser conduit to elevate a fluidized stream of particulate matter received into a first end of the riser conduit from the bridging conduit to a receiving bin adjacent to the second end of the riser conduit. In one embodiment, the riser conduit comprises a flexible conduit such as a hose. In another embodiment, the riser conduit may comprise a rigid portion, such as a pipe, or a combination of a flexible portion and a rigid portion connected in sequence to form the riser conduit. The first end of the riser conduit is connected to receive the fluidized stream emerging from the second end of the bridging conduit, and the second end of the riser conduit is positioned to discharge the fluidized stream of matter into a bin substantially elevated above the first end of the riser conduit. The riser conduit comprises a conveyor tube between the first end and the second end through which the fluidized stream of matter is conveyed. The riser conduit further comprises a gas passage to provide pressurized gas to a plurality of apertures along the conveyor tube of the riser conduit. Gas flows from the gas passage through the apertures into the conveyor tube of the riser conduit. Unlike the bridging conduit, which is generally horizontal, the riser conduit is substantially vertical. The apertures through which gas flows from the gas passage to the conveyor tube may be evenly radially distributed about the perimeter of the conveyor tube along the length of the riser conduit. In another embodiment, the apertures through which gas flows from the gas passage of the riser conduit to the conveyor tube of the riser conduit are generally aligned along one radial side of the conveyor tube and generally evenly distributed along the length of the riser conduit. The riser conduit being substantially vertical, gravity opposes upwardly movement of the fluidized stream through the conveyor tube, a condition which may contribute to packing, but gravity does not cause particles to settle towards a bottom side of a horizontally-oriented conveyor tube of the riser conduit as it does in the bridging conduit.

The second end of the riser conduit is positioned to discharge the fluidized stream of matter into a bin at a station on a process line. The bin is generally large compared to the diameter of the riser conduit to dramatically slow the rate of flow of the fluid stream and to thereby promote rapid settling of particulate matter in a bottom of the bin. Air or gas liberated by the rapid settling of the particles from the fluidized stream is discharged from the bin. In one embodiment, the air or gas is discharged through baffles, filters or through a cyclone separator to remove entrained dust or particles of matter. The volume of air released from the bin for every pound (or kilogram) of matter transported to the bin through the riser conduit is substantially less than the volume of air that would have otherwise been required to transport the pound (or kilogram) of matter pneumatically. Additionally, the replenishment system of the present invention conveys matter in a manner that prevents settling, clogging and clumping, and in a manner that eliminates the need to manually stir or agitate the matter during or prior to conveyance to the bin.

These and other objects of the invention will become apparent from the discussion of the embodiments illustrated in the drawings appended hereto.

DETAILED DESCRIPTION OF THE PREFERRED EMBODIMENT

Fluidization is a process whereby a finely divided granular material is converted from a static, solid-like state to a dynamic fluid-like state. This process occurs when a fluid, which may be a liquid or a gas, is passed up and through the granular material. In the case of food seasonings, a liquid would make the seasoning difficult to uniformly apply to a food product on the processing line, so the preferred method of fluidizing a food seasoning is by using a gas such as air.

When a gas flow is introduced through the bottom of a bed of solid particles such as food seasoning, it will move upwards through the bed via the empty spaces between the particles. At low gas velocities, aerodynamic drag on each particle of seasoning is also low, and the bed remains in a fixed state due to the weight of the particles stacked one on top of others. Increasing the velocity of the gas causes the increased aerodynamic forces to begin to counteract the gravitational force, thereby causing the bed to expand in volume as adjacent seasoning particles move one away from the other. Further increasing the velocity causes the critical condition to be reached—when the upward forces on the particles exactly counterbalance the gravitational force on the particles—and the particles become suspended within the gas. At this condition, the portion of the bed of solid particles adjacent to the incoming gas streams will be fluidized because, like a fluid, the bed of particles will generally begin to conform to the shape of the vessel or container in which the bed is fluidized, and the fluidized portion of the bed will exhibit fluid-like behavior, including the capacity to flow as would a liquid in response to an applied pressure differential.

Figure 1:
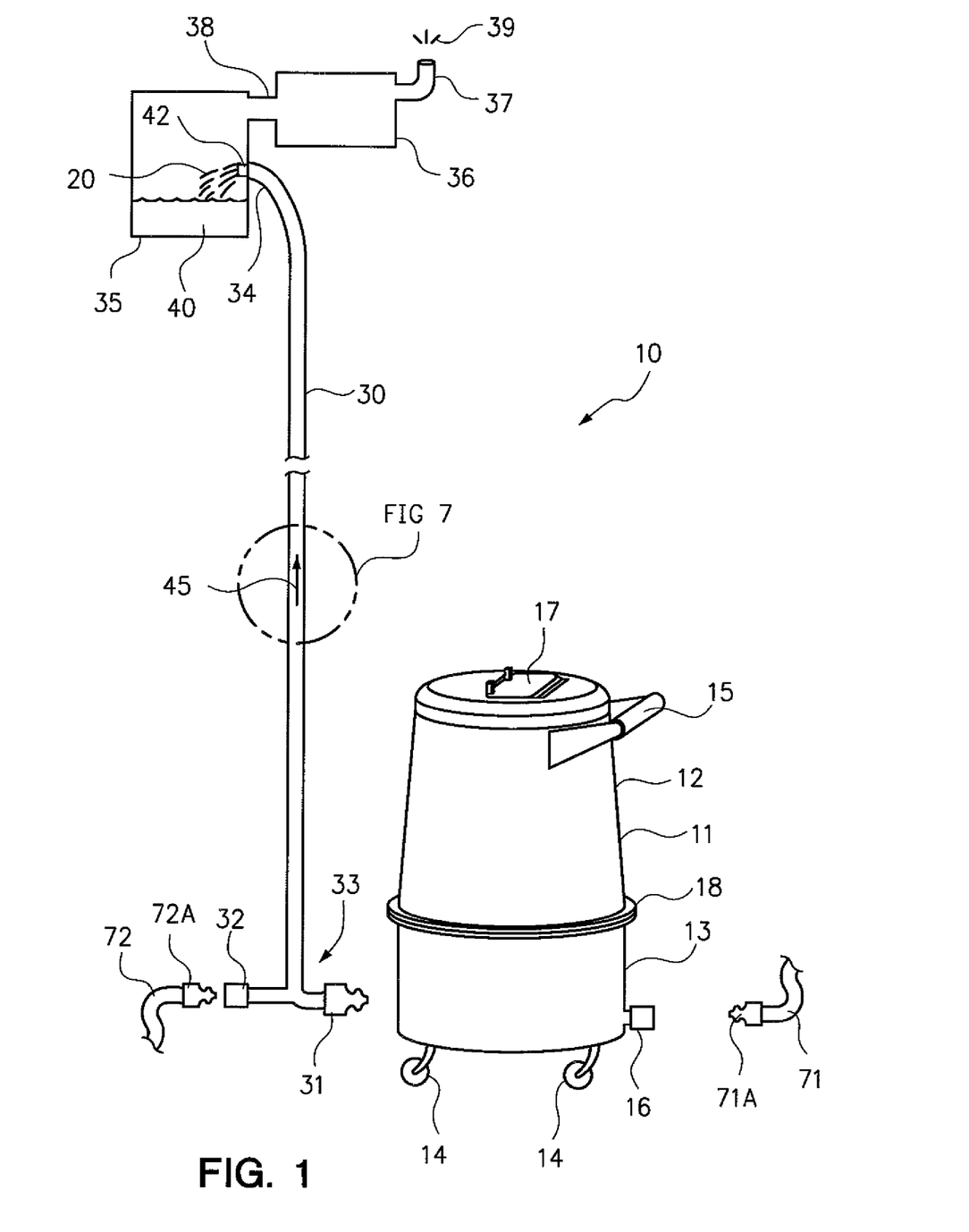
FIG. 1 is a perspective view of one embodiment of a replenishment system of the present invention comprising a container, a riser conduit and an elevated receiving bin.

FIG. 1 is a perspective view of one embodiment of a replenishment system 10 of the present invention comprising a container 11, a riser conduit 30 and a receiving bin 35. The container 11 includes a top portion 12, a bottom portion 13, and a hatch 17 in the top portion 12 to receive into the container 11 a volume of seasoning having a finely divided particulate state. The container 11 of FIG. 1 further includes rolling support members 14 to enable movement of the container 11 along a smooth plant floor and a handle 15 for controllably moving the container 11 on the rolling support members 14. The container 11 further comprises a gas connector 16 to receive a supply of pressurized gas, such as air, from a remote source (not shown) into the bottom portion 13 of the container 11. The gas connector 16 connects to a gas conduit 71, such as a hose, having a connector 71A thereon to engage the gas connector 16. In one embodiment, the gas connector 16 comprises a type of quick-disconnect coupling. The embodiment of the container 11 illustrated in FIG. 1 further comprises a flange 18 to enable the connection of a flange on the top portion 12 to a flange on the bottom portion 13 as discussed below, and a discharge connector 52 (not shown in FIG. 1—see FIG. 4).

The system 10 illustrated in FIG. 1 further comprises a riser conduit 30 having a conveyor tube connector 31 and a gas connector 32 at an inlet end 33 of the riser conduit 30. In one embodiment, the conveyor tube connector 31 and/or the gas connector 32 may comprise types of quick-disconnect couplings. The gas connector 32 connects to a gas conduit 72, such as a hose, having a connector 72A. The riser conduit 30 provides for the movement of a fluidized stream 20 in the direction of the arrow 45 and comprises a discharge end 34 at which a conveyor tube 42 within the riser conduit 30 is positioned to discharge a fluidized stream 20 to a receiving bin 35. In the embodiment of the system 10 illustrated in FIG. 1, the receiving bin 35 comprises a dust filter 36 to remove dust from a gas stream 39 exiting the dust filter 36 through an exhaust duct 37. The dust filter 36 receives the gas stream 39 from the receiving bin 35 through a connecting duct 38. Seasoning 40 removed from the fluidized stream 20 discharged from the riser conduit 30 to the receiving bin 35 accumulates in the bin 35. The seasoning 40 may be removed from the bin 35 and dispensed onto food product (not shown) using, for example, an augur-drive conveyor/dispenser (not shown) or some other conveying and/or dispensing device that uniformly applies seasoning.

Figure 2:
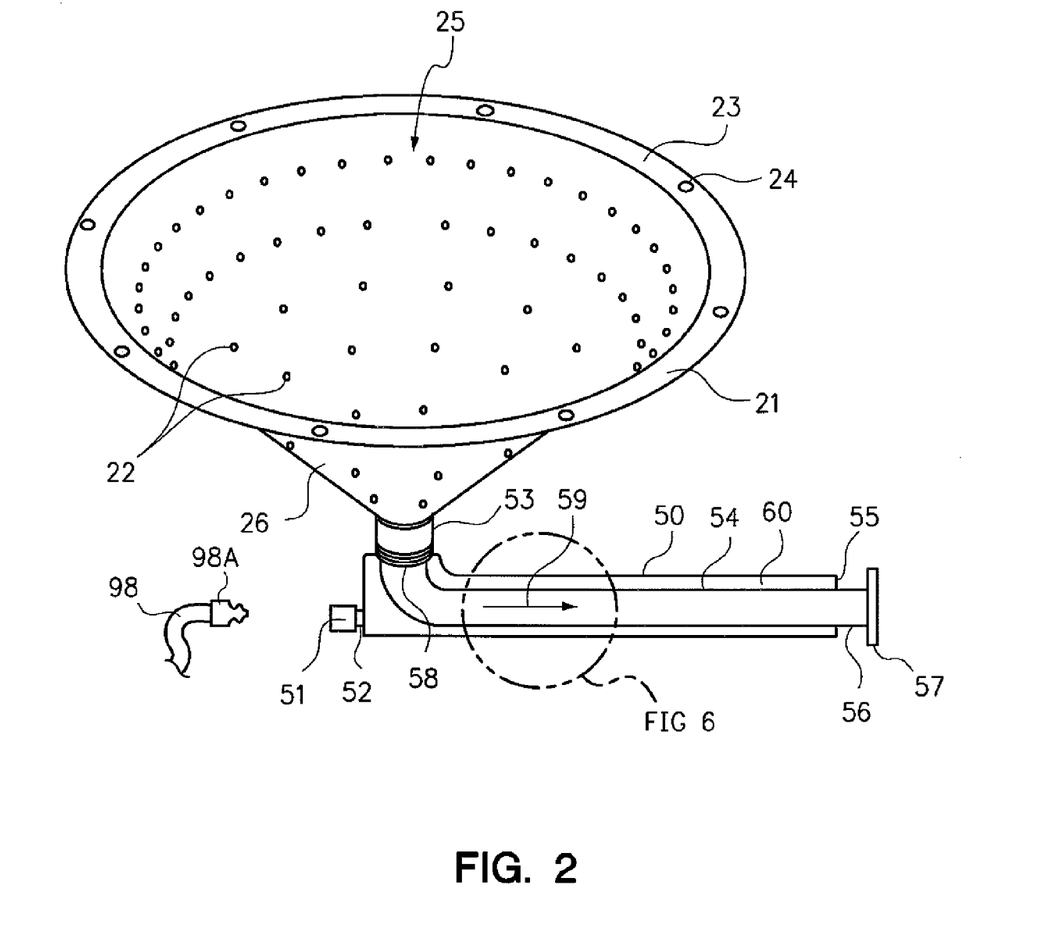
FIG. 2 is a perspective view of the pan and a sectioned view of the bridging conduit of the replenishment system of the present invention.

FIG. 2 is a perspective view of a pan 21 and a sectioned view of a connected bridging conduit 50 of the container 11 of the replenishment system 10 of FIG. 1. The pan 21 includes a flange 23 having a plurality of holes 24 to enable the assembly of the container 11 (see FIG. 1) and a generally conical portion 25 to receive and support a volume of seasoning (not shown) deposited through the hatch 17 (see FIG. 1). A plurality of apertures 22 are spaced within the pan 21 and extend from the exterior 26 of the pan 21 to the interior conical portion 25 of the pan 21. The conical portion 25 of the pan 21 extends from the flange 23 to a discharge port 58 (see FIG. 3-5) that may be threadably connected to a coupling 53 that joins the pan 21 to the bridging conduit 50. The bridging conduit 50 includes a first end 52 connected to the pan 21 through the coupling 53, a second end 56 having a discharge connector 57, a conveyor tube 54 therebetween, a gas connector 51 and a gas passage 60 to supply gas from the gas connector 51 to a plurality of apertures 41 (not shown in FIG. 2—see FIG. 4) spaced along the conveyor tube 54. The embodiment of the bridging conduit 50 of FIG. 2 includes a gas passage 60 that terminates at an end 55. This structure forces all gas provided to the gas passage 60 through the bridging gas connector 51 to flow through apertures 41 (not shown in FIG. 2—see FIG. 6) in the conveyor tube 54. The bridging gas connector 51 connects to receive gas from a gas conduit 98, such as a hose, having a connector 72A. It will be understood that, in one embodiment, the gas conduit 72 that connects to the riser gas connector 32 (see FIG. 1) and the gas conduit 98 that connects to the bridging gas connector 51 in FIG. 2 are identical in structure but may provide gas at different pressures, as will be discussed in connection with FIG. 9 below. Embodiments of the apparatus and system of the present invention may, for convenience, include jumpers, leaders and other sections of conduit intermediate a gas connector and a gas source.

Figure 3:
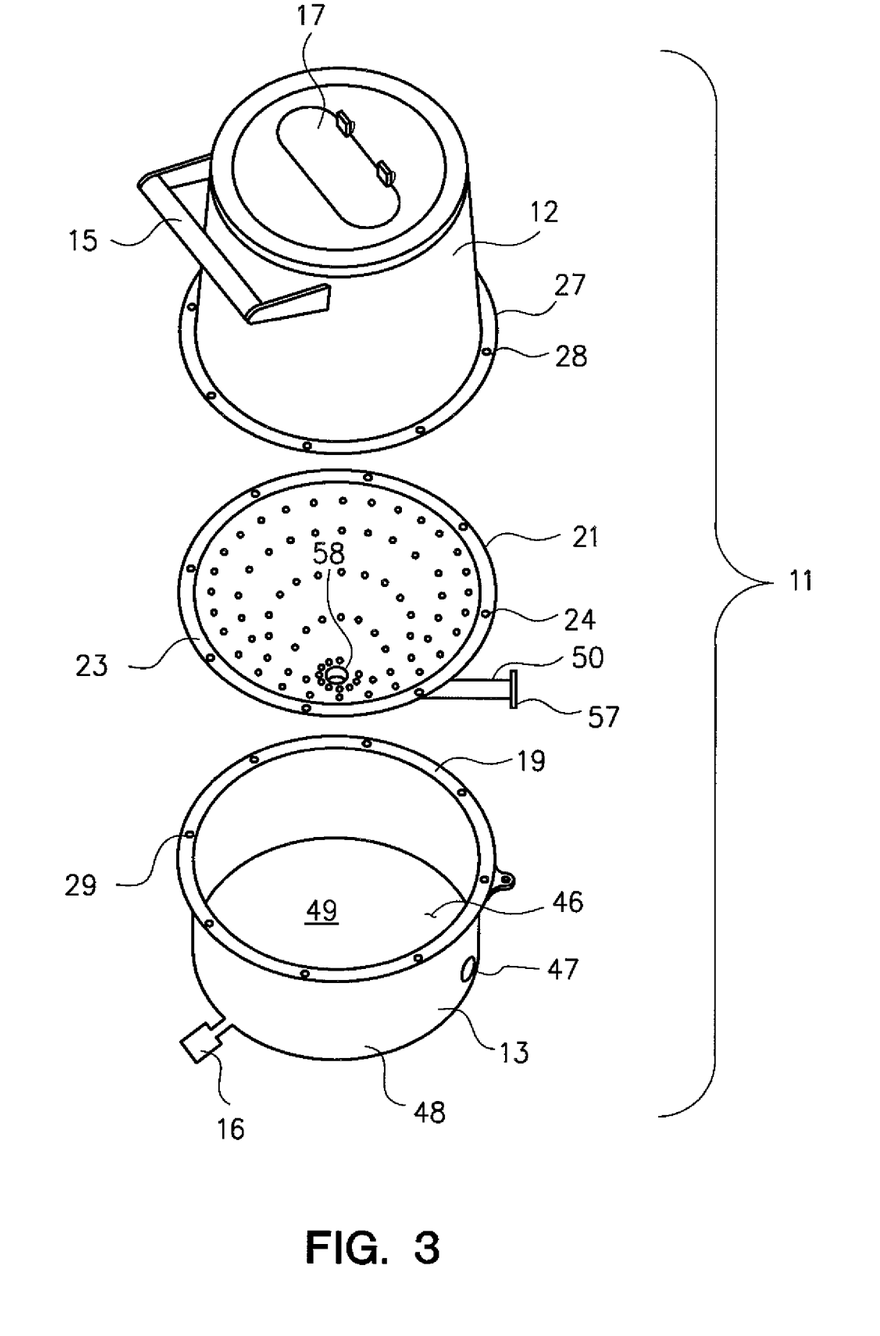
FIG. 3 is an exploded perspective view of the primary components of the container of the replenishment system of FIG. 1.

FIG. 3 is an exploded perspective view of the container 11 of the replenishment system 10 of FIG. 1 revealing the manner in which the container 11 is assembled and the relative positions and alignment of the components of the container 11. The top portion 12 comprises a flange 27 having a plurality of holes 28 therein, a handle 15 for convenient movement of the container 11 and a hatch 17 openable to receive a volume of seasoning into the container 11 to be supported on the pan 21. The hatch 17 closes to seal the container 11 against leakage.

The container 11 further comprises a pan 21 including a flange 23 having a plurality of holes 24 therein alignable with the holes 28 of the top portion 12. The container 11 further comprises a bottom portion 13 having a flange 19 having a plurality of holes 29 alignable with the holes 28 of the top portion 12 and also with the holes 24 in the pan 21. The bottom portion 13 of the container 11 further comprises a gas connector 16 to provide for the introduction of pressurized gas into the interior 46 of the bottom portion 13 of the container 11. The bottom portion 13 further comprises a penetration 47 in the side 48 of the bottom portion 13 to receive and seal against a flange member 57 on the conveyor tube 54 of the bridging conduit 50. The penetration 47 may be on the side 48 of the bottom portion 13, as illustrated in FIG. 4 or, alternately, the penetration 47 may be in the floor 49 of the bottom portion 13 and aligned with the discharge port 58 of the pan 21, as illustrated in FIG. 5.

Figure 4:
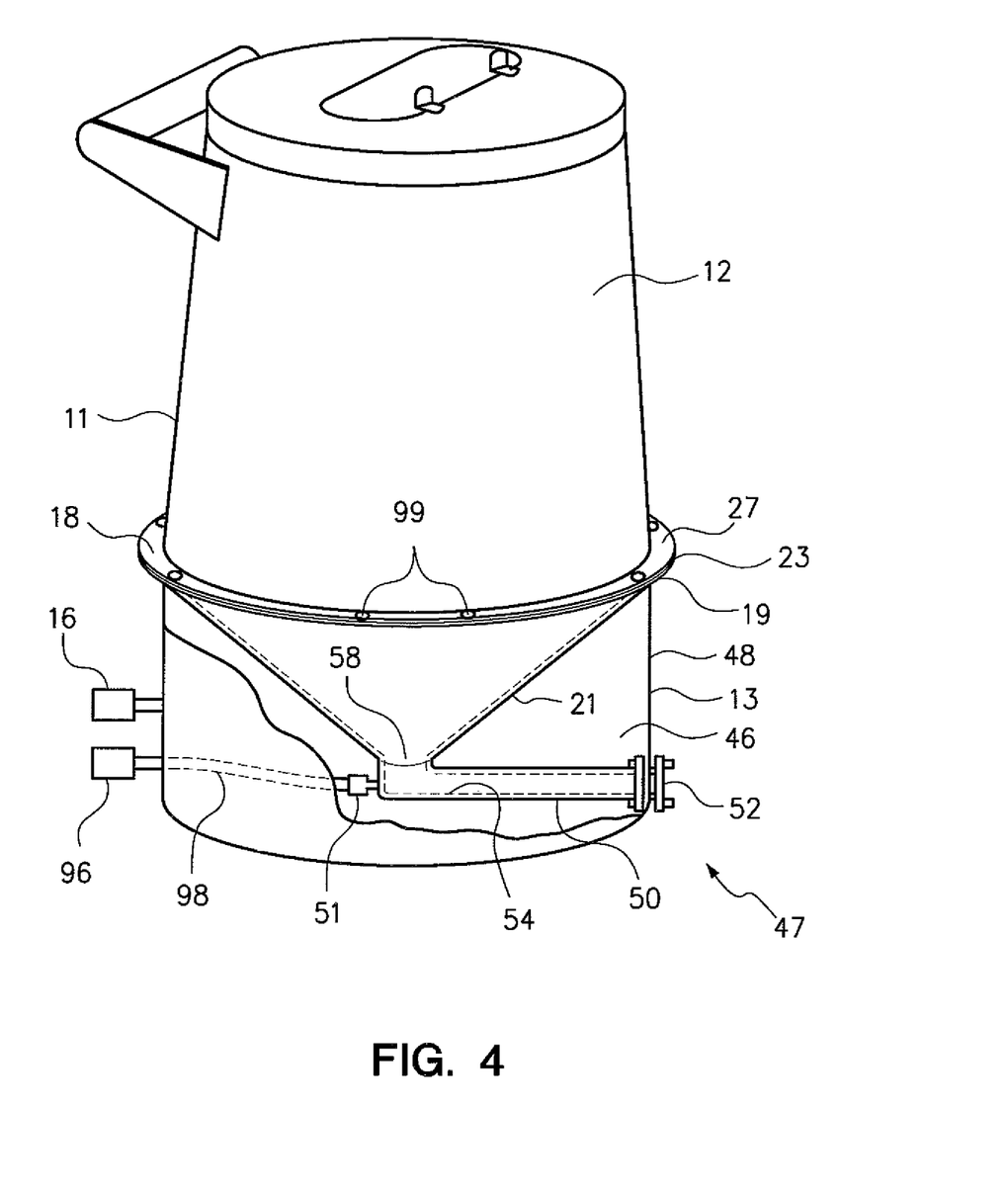
FIG. 4 is a partial sectional view of the bottom portion of the container of the replenishment system of FIG. 1.

FIG. 4 is a perspective view of the container 11 of FIGS. 1 and 3 with a part of the side 48 of the bottom portion 13 removed to reveal the structure of the pan 21 and the connected bridging conduit 50 after assembly of the container 11 components illustrated in FIG. 3. The flange 18 on the assembled container 11 of FIG. 4 includes the flange 27 of the top portion 12, the flange 23 of the pan 21 and the flange 19 of the bottom portion 13 connected using fasteners 99. The pan 21 descends from the flange 18 into the interior 46 of the bottom portion 13 and is connected to the bridging conduit 50 at the discharge port 58 at the center of the pan 21. The bridging conduit 50 of FIG. 4 is generally a sleeve within a sleeve, as will be discussed below in connection with FIG. 6. The conveyor tube 54 of the bridging conduit 50 is received through the penetration 47 in the side 48 of the bottom portion 13 of the container 11 and a connector 52 is secured to the bridging conduit 50 to provide for connection to the riser conduit 30 (not shown—see FIG. 1). The bridging conduit 50 is connected to receive pressurized gas through a gas connector 96, a gas leader 98 and a gas connector 51 on the bridging conduit 50. The interior 46 of the bottom portion 13 of the container 11 receives gas through gas connector 16.

Figure 5:
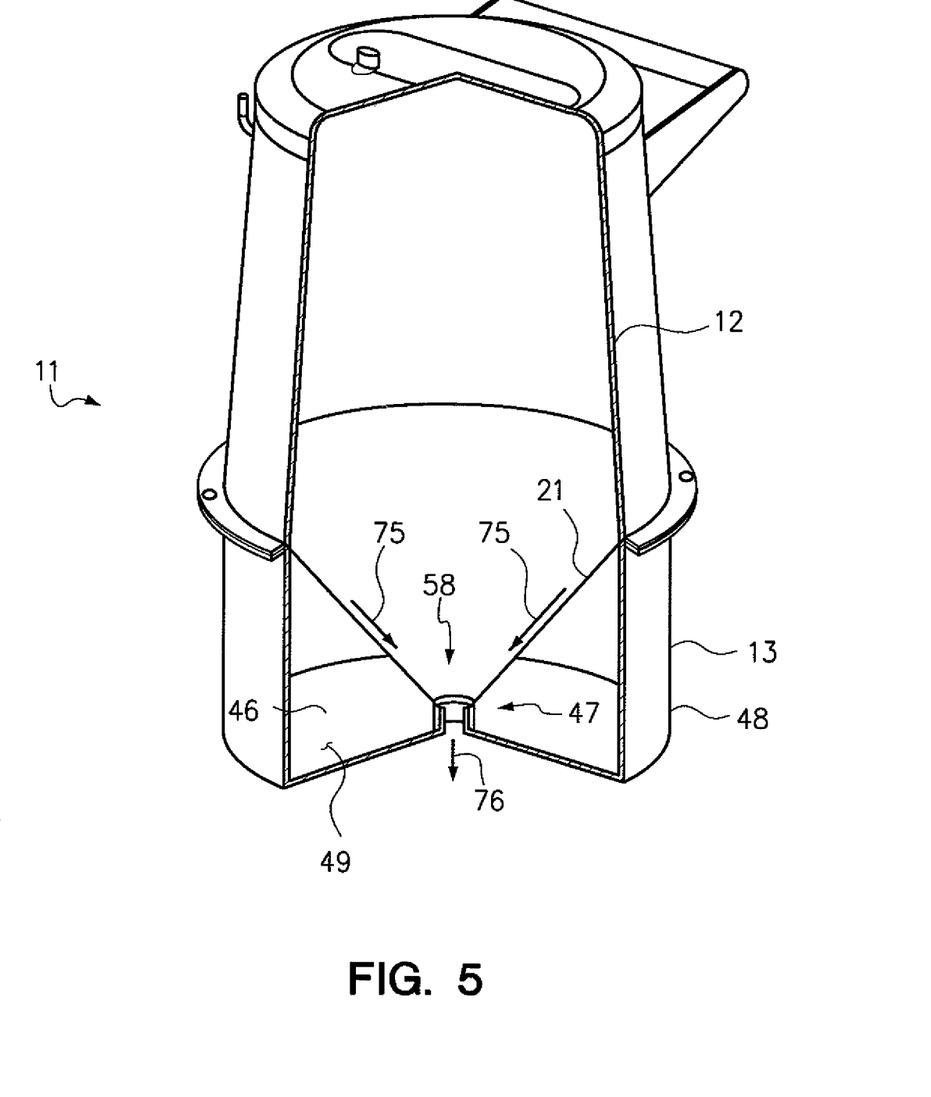
FIG. 5 is a perspective, quarter-sectional view of the container of FIG. 1 illustrating the fluidization and flow of a portion of the particulate matter received on the pan.

FIG. 5 is a quartered sectional perspective view of an alternate container 11 illustrating the movement of seasoning within the pan 21 upon fluidization and illustrating an alternative path for the bridging conduit 50 (not shown in FIG. 5—see FIGS. 2 and 4). The container 11 of FIG. 5 comprises a penetration 47 in the bottom portion 13 that is disposed within the floor 49 of the bottom portion 13, immediately adjacent to the discharge port 58 of the pan 21, instead of on the side 48 of the bottom portion 13, as illustrated in FIG. 4. By contrast, the bridging conduit 50 in the embodiment of the container 11 illustrated in FIGS. 2 and 4 is disposed within the bottom portion 13 of the container 11. The bridging conduit 50 (not shown in FIG. 5) will be external to the bottom portion 13 of the container 11 of FIG. 5 and surrounded by atmospheric air rather than subjected to the pressure provided through gas connector 16 to the interior 46 of the bottom portion 13.

FIG. 5 illustrates the direction of movement of the portion of finely divided particulate matter (not shown) supported on the pan 21 of the top portion 12 and fluidized by gas streams (not shown) emerging from apertures 22 (not shown in FIG. 5—see FIG. 3) in the pan 21. Upon reaching a fluidized state, the particulate matter, which may be food seasoning, will move along the pan 21 in the direction of arrows 75 to the discharge port 58 and in the direction of arrow 76 to the bridging conduit 50 (not shown in FIG. 5).

Figure 6:
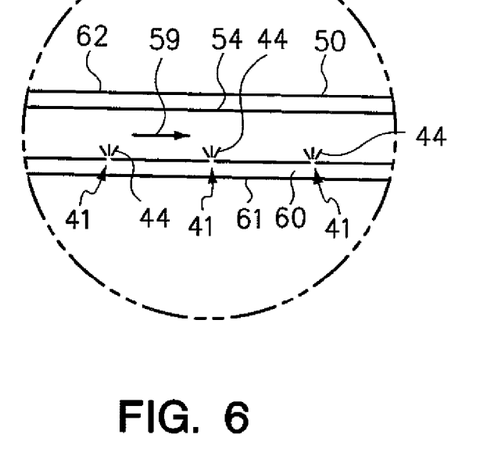
FIG. 6 is an enlarged section view of a portion of the bridging conduit of FIG. 2.

FIG. 6 is an enlarged section view of a portion of the bridging conduit 50 of FIG. 2 revealing the plurality of apertures 41 in a conveyor tube 54 to provide a flow of gas from the gas passage 60 into the conveyor tube 54 by way of the apertures 41. The gas streams 44 emerging from the apertures 41 maintain the fluidized state of the finely divided particulate matter (not shown) conveyed through the conveyor tube 54. In the embodiment of the bridging conduit 50 illustrated in FIG. 6, the plurality of apertures 41 are disposed along a lower side 61 of the conveyor tube 54 to provide a series of spaced-apart and upwardly-directed gas streams 44. Additional apertures 41 may be disposed along a top side 62 of the conveyor tube 54 to further provide for the flow of gas from the gas passage 60 through the apertures 41 into the conveyor tube 54, but apertures 41 along the lower side 61 are more critical to sustaining fluidized flow due to the substantially horizontal direction of fluidized flow indicated by the arrow 59.

Figure 7:
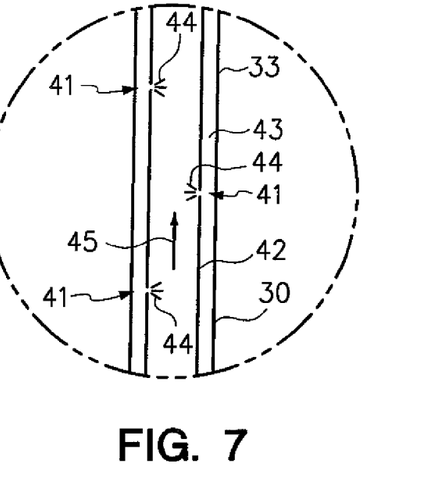
FIG. 7 an enlarged section view of a portion of the riser conduit of FIG. 1.

FIG. 7 is an enlarged section view of a portion of the riser conduit 30 of FIG. 1 revealing a plurality of apertures 41 in the conveyor tube 42 to provide for the flow of gas from the gas passage 43 into the conveyor tube 42 by way of the apertures 41. The gas streams 44 emerging from the apertures 41 sustain the fluidized flow of particulate matter (not shown) conveyed generally vertically through the conveyor tube 42. The pressure of gas in the gas passage 43 exceeds the pressure within the conveyor tube 42 to move gas from the gas passage 43 through the apertures 41 and into the conveyor tube 42. Gas streams 44 unsettle finely divided particulate matter moving through the conveyor tube 42 and either induce fluidized flow or sustain fluidized flow through the conveyor tube 42 in the direction of arrow 45.

Figure 8:
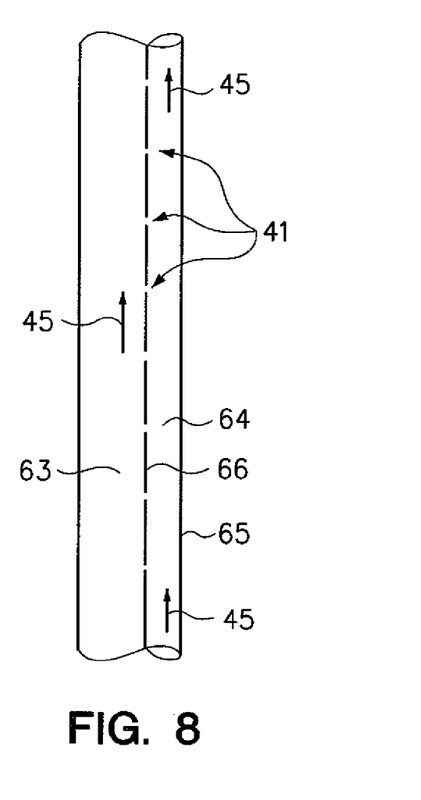
FIG. 8 is a section view of an alternate bridging conduit and/or riser conduit of a replenishment system of the present invention.

FIG. 8 is a sectioned view of an alternate embodiment of a riser conduit 65 of a replenishment system 10 (see FIG. 1) of the present invention having a conveyor tube 63 and a gas passage 64 attached along a side 66 of the conveyor tube 63. A series of generally aligned apertures 41 along the side 66 of the conveyor tube 63 provide for the flow of gas from the gas passage 64 into the conveyor tube 63 to sustain flow of fluidized matter through the conveyor tube 63 and in the direction of arrows 45. An alternate embodiment of the system 10 (see FIG. 1) of the invention may comprise a bridging conduit 50 (see FIGS. 2 and 4) having this alternate structure of the gas passage 64 along a side 66 of the conveyor tube 63 as long as the aligned apertures 41 are disposed along a bottom side 61 (see FIG. 6) of the conveyor tube 54 therein to thereby counteract the effect of gravity on fluidized flow of particulate matter.

Figure 9:
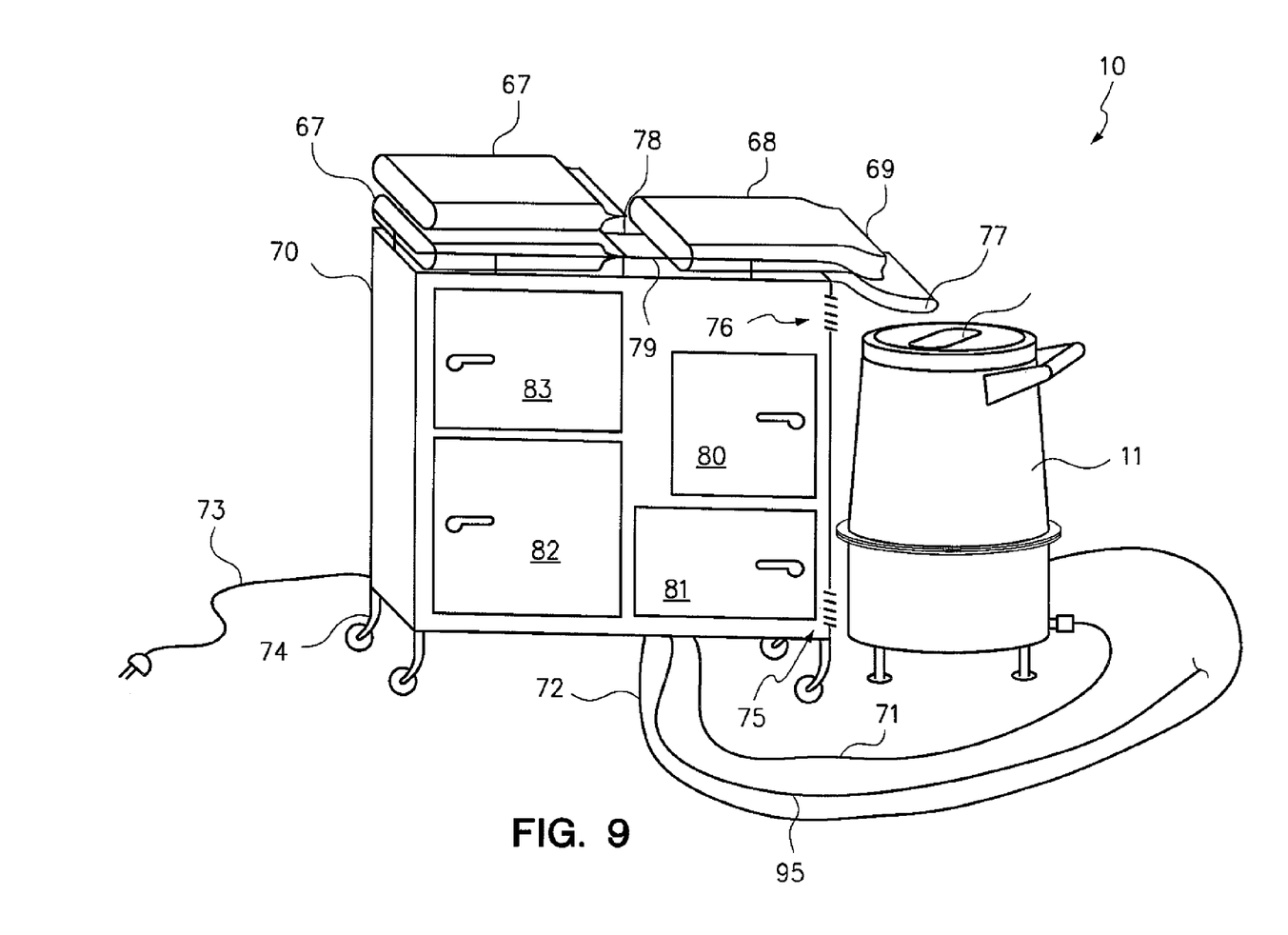
FIG. 9 is a perspective view of an embodiment of the system of the present invention having a replenishment container and a bulk storage unit equipped with a dust suppression system.
Figure 10:
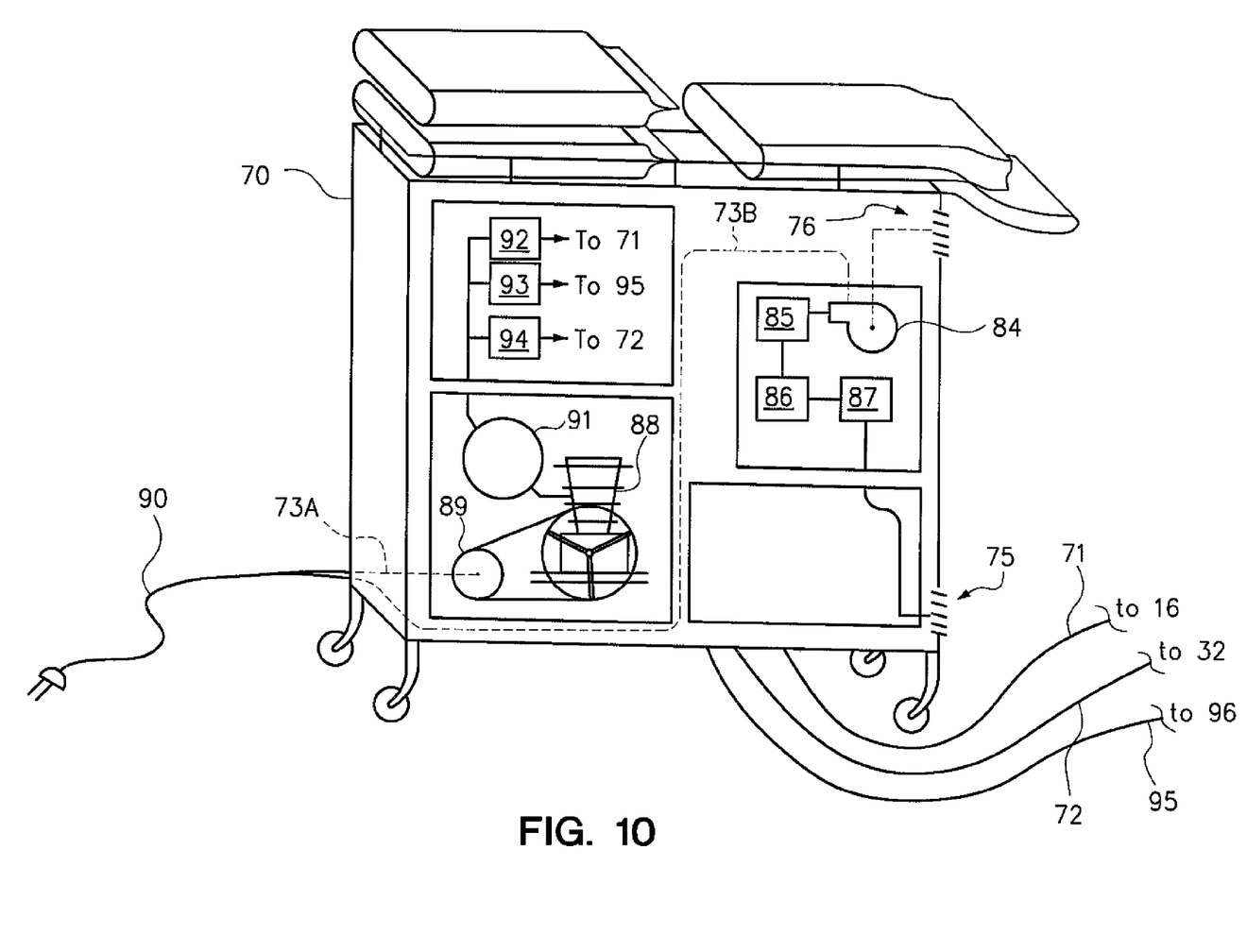
FIG. 10 is the bulk storage unit of FIG. 9 with panels removed to reveal components therein.

FIG. 9 is a perspective view of an alternate embodiment of the replenishment system 10 of the present invention including a container 11 and a bulk storage unit 70 having a filtration system (not shown in FIG. 9—see FIG. 10). The riser conduit 30 is omitted from FIG. 9 for simplification (see riser conduit 30 in FIG. 1). The replenishment system 10 of FIG. 9 includes a bulk storage unit 70 with a support surface 78 to support bulk packages 67 of seasoning, a plurality of rolling supports 74, a plurality of compartments (not shown) behind doors 81, 82, 83 and 84, an air intake register 76, an air exhaust register 75 and a power supply cable 73. The bulk storage unit 70 also includes a rail 79 around the support surface 78 to prevent unwanted movement of bulk packages 67. The embodiment of the bulk storage unit 70 illustrated in FIG. 9 also includes a pouring ramp 77 to provide for the convenient pouring of seasoning from a bulk package 68 positioned thereon and opened at the top 69 to enable transfer of the seasoning within the bulk package 68 through the hatch 17 and onto the pan (not shown) of the adjacent container 11. The pouring ramp 77 is preferably structured to position the top 69 of the bulk package 68 above the hatch 17 of the container 11 when the container 11 moved to a position adjacent to the air intake register 76.

In the embodiment of the bulk storage unit 70 of FIG. 9, the air intake register 76 is connected to a motor-driven fan (not shown in FIG. 9) to draw air displaced from the container 11 and adjacent to the hatch 17 of the container 11 into a filtration system (not shown in FIG. 9). Filtered air is discharged through air exhaust register 75. The filtration system supported within the bulk storage unit 70 prevents dust generated during re-filling of the container 11 with food seasoning from release into the plant environment.

In one embodiment, the bulk storage unit 70 of the replenishment system 10 may comprise an air source (not shown in FIG. 9) and one or more pressurized air supply conduits 71, 72 and 95. The air supply conduit 95 connects to supply air to the external gas connector 96 which, in turn, supplies the gas connector 51 on the bridging conduit 50 through the jumper 98 (see FIG. 4). The air supply conduit 71 connects to the gas connector 16 which supplies gas to the interior 46 of the bottom portion 13 (see FIG. 3) of the container 11 to provide for the flow of gas through the apertures 22 of the pan 21. The air supply conduit 72 connects to the gas connector 32 which supplies the gas to the riser conduit 30 (see FIG. 1).

FIG. 10 is an enlarged view of the bulk storage unit 70 of FIG. 9 with doors 81, 82, 83 and 84 removed to illustrate one arrangement of various components within the bulk storage unit 70 of the system 10 of FIG. 9. FIG. 10 illustrates an air mover 84 positioned adjacent the air intake register 76. During filling of the container 11 (not shown in FIG. 10—see FIG. 9) with seasoning, the air mover 84, powered by electricity provided through electric cables 90 and 73B, operates to draw air into the air intake register 76 of the bulk storage unit 70 and through a series of air filters 85, 86 and 87 to remove dust particles. Filtered air is reintroduced into the plant environment through air exhaust register 75. Filters 85, 86 and 87 may include high-efficiency particulate air (HEPA) filters arranged with, for example, a course filter 85 disposed upstream of finer filters 86 and 87. The bulk storage unit 70 of FIG. 10 further includes an air compressor 88 driven by an electric motor 89 that receives current through a electric cables 90 and 73A. Compressed air from the air compressor 88 may be filtered to remove any contaminants such as oils or lubricants in a discharge filter 91. Compressed air is supplied to a first regulator 92, a second regulator 93 and a third regulator 94. The first regulator 92 operates to maintain a first pressure in the container gas conduit 71, the second regulator 93 operates to maintain a second pressure in the bridging gas conduit 95 and the third regulator 94 operates to maintain a third pressure in the riser gas conduit 72. The regulators 92, 93 and 94 may be used to control the pressure of air supplied to the container 11 (not shown—see FIG. 1), the bridging conduit 50 and the riser conduit 30 to ensure that the pan 21, the conveyor tube 54 of the bridging conduit 50 and the conveyor tube 63 of the riser conduit 30 operate at proper pressures, one relative to the others, to provide for sustained and steady fluidized flow from the pan 21, to and through the bridging conduit 50, and from the bridging conduit 50 to and through the riser conduit 30. Other arrangements can be used to obtain the desired flow sequence such as, for example, using only two regulators, a first to control the pressure of the gas supplied to bridging conduit 50 and a second to control the pressure of the gas supplied to the riser conduit 30, with the unregulated flow of gas from the source being directed to the container 11 for fluidization of material within the pan 21. Alternately, the gas pressure can be regulated by manipulation of the number and the relative sizing of the apertures in the pan 21, the conveyor tube 54 of the bridging conduit 50 and the conveyor tube 63 of the riser conduit 30, but the ability to adjust one pressure or one flow rate relative to the other may be lost or impaired.

It will be understood that the flow rates of the gas through the apertures 22 of the pan 21 and through the apertures 41 of the conveyor tube 42 may be varied to optimize fluidization of materials having different densities. For example, but not by way of limitation, the apparatus and system of the present invention may be utilized to transport granulized salt which has a substantially greater density than, for example, granulized food seasoning. The optimal rate of flow of gas through the apertures 22, 41 to fluidize, or to maintain fluidization of, the material being transported using the apparatus and system of the present invention will be greater for salt than for food seasoning. For this reason, an embodiment of the apparatus and system of the present invention may comprise two or more pre-set regulators to regulate the flow of gas to the interior 46 of the bottom portion 13 of the container 11, and may further comprise two or more pre-set regulators to regulate the flow of gas to the gas passage 60 along the conveyor tube 54. This embodiment will enable plant personnel using the apparatus and system of the present invention to simply route the gas supply to, for example, the interior 46 of the bottom portion 13 of the container 11 through a first pre-set regulator for salt, or through a second pre-set regulator for food seasoning. This approach prevents plant personnel from having to spend time adjusting and re-adjusting a single regulator to optimize performance of the apparatus and system.

The bulk storage unit 70 of FIGS. 9 and 10 may comply with standards promulgated by the National Electrical Manufacturers' Association (NEMA) and the filtration unit of the bulk storage unit 70 may comply with regulations promulgated by the Occupational Safety and Health Administration (OSHA) for personnel safety.

The air compressor 88 and filter 91 of the bulk storage unit 70 illustrated in FIG. 10 may be eliminated by use of a supply of compressed air provided through a conventional compressed air distribution system in the plant.

Fluidization of a finely divided particulate matter such as seasonings used on food products generally requires compressed air in a range of about 0.5 psig to about 12 psig, more specifically from about 3 psi to about 7 psig. The optimal pressure needed for fluidization of seasoning depends in part on the particle size, density of the particles that make up the seasoning, effective density of the fluidized particulate matter moving within a component of the system of the present invention, the friction loss in the various system components and the elevation traversed by the riser conduit 30, among other factors. The pressure required in the container 11 of the system 10 of the present invention (see FIG. 1) to move a fluidized stream of material to the receiving bin 35 is a function of factors including the discharge pressure in the receiving bin 35, the effective density of the fluidized stream, the elevation of the receiving bin 35 relative to the container 11, and friction losses in the path of the fluidized stream from the container 11 to the receiving bin 35. In some embodiments of the present invention, the dust filter 36 that removes dust from the air discharged from the receiving bin 35 may elevate the pressure in the receiving bin 35 above atmospheric pressure. The effective density of the fluidized stream may take into account the lessening of the density of the fluidized stream, in the bridging conduit 50 and in the riser conduit 30 as a result of the addition of gas to the fluidized stream in these portions of the system 10 without an offsetting addition of particulate material.

The apertures 22 and 41 in the pan 21 (see FIGS. 2 and 3), the conveyor tube 54 of the bridging conduit 50 and the conveyor tube 63 (see FIGS. 6 and 7) of the riser conduit 30 may be formed using methods to shape and condition the gas streams that emerge from the apertures 22 and 41 and to thereby maximize fluidization and to minimize burrs that impede smooth flow of fluidizing gas streams. For example, the apertures 22 and 41 may be formed by chemically etching an aperture in a stainless steel pan 21 or in a stainless steel conveyor tube 54 or conveyor tube 63. A preferred aperture size is about 0.03 inches (0.76 mm) although holes in the range of about 0.01 inches (0.025 mm) to 0.05 inches (1.27 mm) or more may be effective in initiating or sustaining fluidization of particulate matter.

The apertures 22 of the pan 21 (see FIGS. 2 and 3) may be arrayed in rings along the pan 21 in a spaced apart relationship in a range of about 1.5 inches (38.1 mm) to about 3.5 inches (88.9 mm) between adjacent apertures 22 in the ring with the spacing gradually increasing with increased distance from the discharge port 58 of the pan 21.

The term "connector," as used herein, means any mechanical means of coupling one component to another component to provide for the movement of a gas, a fluid or a fluidized stream from the one component to the other component, and may include screwed connections, flanged connections, quick-disconnect connections, valved connections and others. The term "gas," as it is used herein, means any suitable gas, the preferred gas being air. The term "tube," as used herein, does not require the tube to be circular in cross-section, as the tube may have other configurations that allow fluidized flow therethrough.

As used herein, the singular forms "a", "an" and "the" are intended to include the plural forms as well, unless the context clearly indicates otherwise. The terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The embodiments of the system of the present invention described above and illustrated in the appended drawings are not to be considered as limiting of the invention. The scope of the present invention is limited only by the claims that follow.

We claim:

1. A system, comprising:
a selectively sealable container having a top portion, a bottom portion thereunder, a container gas connector, a pan separating the top and bottom portions, and a plurality of apertures through the pan through which gas flows from the bottom portion to the top portion;
a discharge port sealably connected at a low portion of the pan;
a bridging conveyor tube having a first end, a second end and a plurality of apertures spaced along a portion of the bridging conveyor tube between the first and second ends, the bridging conveyor tube being sealably connected at the first end to the discharge port;
a bridging gas passage, adjoining the bridging conveyor tube, having a gas connector in fluid communication with the plurality of apertures spaced along the portion of the bridging conveyor tube to provide gas flow from the bridging gas passage to the bridging conveyor tube;
a vertical riser conveyor tube having a wall with an outer diameter, a plurality of apertures in the wall, a first end connected to the second end of the bridging conveyor tube and a second end positioned adjacent to a receiving bin remote from and elevated relative to the container, the riser conveyor tube being sealably connected at the first end to the second end of the bridging conveyor tube;
a riser gas passage, adjoining the riser conveyor tube, having a wall, an outer diameter that is smaller than the outer diameter of the riser conveyor tube, a gas connector and a plurality of apertures in the wall spaced along at least a portion of the riser gas passage, the plurality of apertures sealably engaging the plurality of apertures of the riser conveyor tube through which gas flows from the riser gas passage, through the engaged apertures in the walls of the riser conveyor tube and riser gas passage and into the riser conveyor tube; and
a source of the pressurized gas sealably connected to provide pressurized gas to each of the gas connector of the container, the gas connector of the bridging gas passage and the gas connector of the riser gas passage.

2. The system of claim 1, wherein the gas connector of the container is sealably connected to provide a flow of a pressurized gas into the bottom portion of the container and through the apertures of the pan into the top portion of the container to fluidize at least a portion of the volume of particulate matter supported on the pan.

3. The system of claim 1, wherein a hatch in the top portion is openable to receive the volume of particulate matter into the container to be supported on the pan there below; and
wherein the hatch is closable to seal the container against loss of pressure.

4. The system of claim 1, wherein the apertures of the bridging conveyor tube provide a flow of gas from the bridging gas passage into the bridging conveyor tube to sustain the fluidized flow of particulate matter received into the bridging conveyor tube from the discharge port of the pan.

5. The system of claim 1, wherein the plurality of apertures of the riser conveyor tube and the engaged plurality of apertures of the riser gas passage together provide a flow of gas from the riser gas passage to the riser conveyor tube to sustain the fluidized flow of particulate matter received into the riser gas conveyor tube from the bridging conveyor tube.

6. The system of claim 1, further comprising:
a bulk storage unit having an air intake register, an air exhaust register and a filter therebetween; and
an air mover to draw air into the air intake register and move the air through the filter and out the air exhaust register.

7. The system of claim 6, wherein the bulk storage unit further comprises:

a support surface to support bulk packages of the particulate matter to be fluidized and conveyed using the system.

8. The system of claim 6, wherein the source of pressurized air comprises:
an air compressor connected to provide pressurized gas to the gas connector of the container, the gas connector of the bridging gas passage and the gas connector of the riser gas passage.

9. The system of claim 1, wherein the pressure of the gas provided to the gas connector of the container is greater than the pressure of the gas provided to the gas connector of the bridging gas passage; and
wherein the pressure of the gas provided to the gas connector of the bridging gas passage is greater than the pressure of the gas provided to the gas connector of the riser gas passage.

10. The system of claim 9, further comprising:
a first pressure regulator to control the pressure of the gas provided to the gas connector of the bridging gas passage.

11. The system of claim 10, further comprising:
a second pressure regulator to control the pressure of gas provided to the gas connector of the riser gas passage.

12. A system, comprising:
a selectively sealable container having a top portion, a bottom portion thereunder, a pan separating the top and bottom portions and a container gas connector;
a discharge port at a low portion of the pan sealably connected to a first end of a bridging conveyor tube having a plurality of apertures;
a bridging gas passage having a gas connector in fluid communication with the plurality of apertures of the bridging conveyor tube;
a riser conveyor tube having a wall, a first end sealably connected to a second end of the bridging conveyor tube, a second end positioned adjacent to a receiving bin at a location that is remote from the container, and a plurality of apertures through the wall therebetween;
a riser gas passage having a wall, an outer diameter smaller than the outer diameter of the riser conveyor tube, a plurality of apertures in the wall that sealably engage the apertures in the wall of the riser conveyor tube and a gas connector in fluid communication with the plurality of apertures;
a source of the pressurized gas sealably connected to the gas connectors of the container, the bridging gas passage and the riser gas passage;
a first regulator to control the pressure of gas provided from the source of pressurized gas to the gas connector of the bridging conveyor tube; and
a second regulator to control the pressure of the gas provided from the source of pressurized gas to the gas connector of the riser conveyor tube;
wherein the top portion of the container is openable to receive a volume of finely divided particulate material into the top portion of the container to be supported on the pan; and
wherein a flow of pressurized gas from the source, through the gas connector of the container and into the bottom portion of the container passes through the apertures of the pan to enter the top portion of the container as gas streams emerging from the apertures to fluidize at least a portion of the volume of particulate matter supported on the pan to thereby induce the fluidized portion to generally downwardly from the pan through the discharge port.

13. The system of claim 12, wherein a flow of pressurized gas from the source, through the first pressure regulator, through the gas connector of the bridging gas passage passes through the apertures of the bridging conveyor tube to enter the bridging conveyor tube as gas streams emerging from the apertures to sustain the fluidized state of the particulate matter leaving the pan through the discharge port as it moves through the bridging conveyor tube.

14. The system of claim 12, wherein a flow of pressurized gas from the source, through the second pressure regulator, through the gas connector of the riser gas passage passes through the plurality of apertures of the riser gas passage and through the engaged apertures of the riser conveyor tube to enter the riser conveyor tube as gas streams emerging from the apertures to sustain the fluidized state of the particulate matter received from the bridging conveyor tube as it moves through the riser conveyor tube to the receiving bin.

15. The system of claim 14, wherein the first regulator is set to maintain the pressure of the gas provided to the gas connector of the bridging gas passage at a pressure below that of the gas provided to the gas connector of the container.

16. The system of claim 15, wherein the second regulator is set to maintain the pressure of the gas provided to the gas connector of the riser gas passage at a pressure below that of the gas provided to the gas connector of the bridging gas passage.

17. The system of claim 16, wherein the gas is air.

18. The system of 12, wherein at least a substantial portion of the apertures that provide the flow of gas from the bridging gas passage to the bridging conveyor tube are disposed along a bottom side of the bridging conveyor tube.

19. The system of claim 12, wherein the bulk storage unit further comprises:
an air compressor connected to provide pressurized air to the container, the first regulator and the second regulator.

20. The system of claim 12, further comprising:
a bulk storage unit having a support surface to support packages of the particulate matter, an air intake register, an air exhaust register, an air mover intermediate the air intake register and the air exhaust register and a filter intermediate the air intake register and the air exhaust register.

21. The system of claim 1, wherein the plurality of apertures in the riser gas passage are aligned.

22. The system of claim 12, wherein the plurality of apertures in the riser gas passage are aligned.

* * * * *